Figure 1:
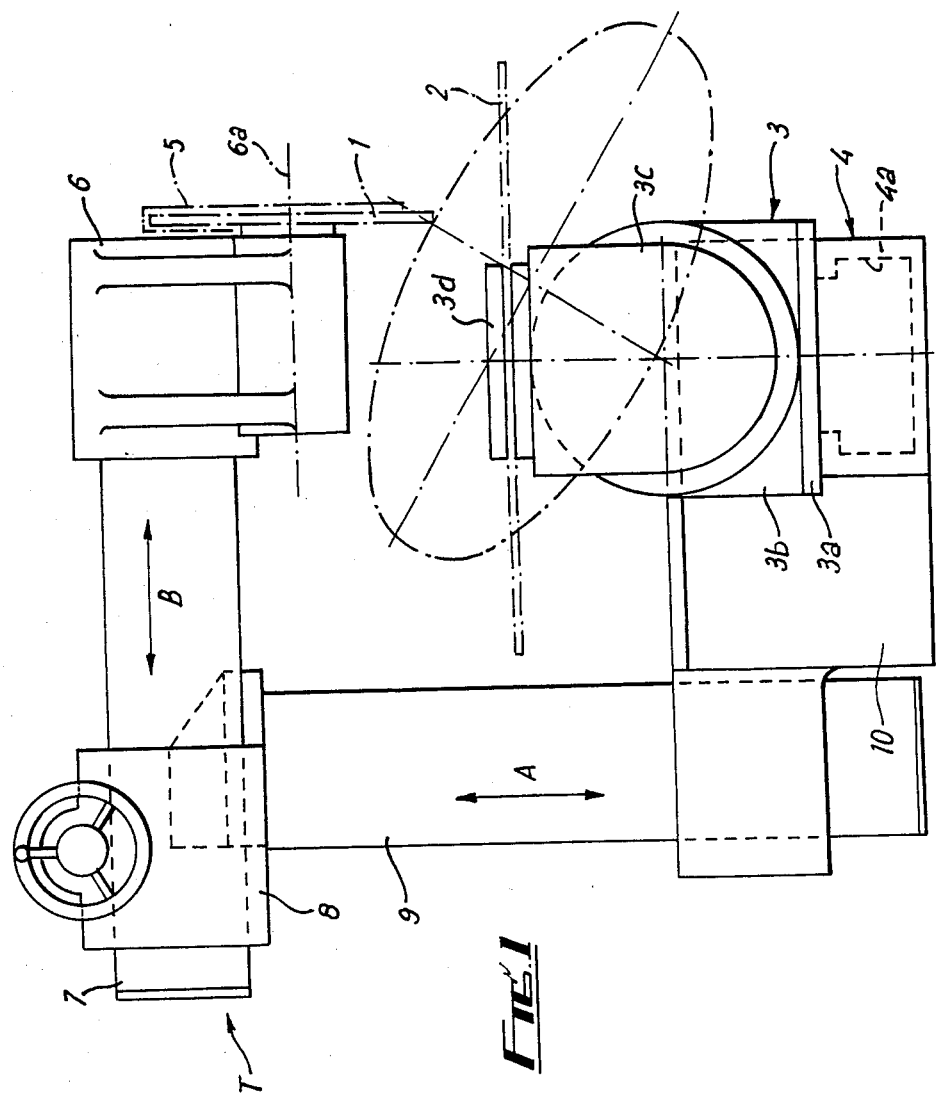
Figure 9:
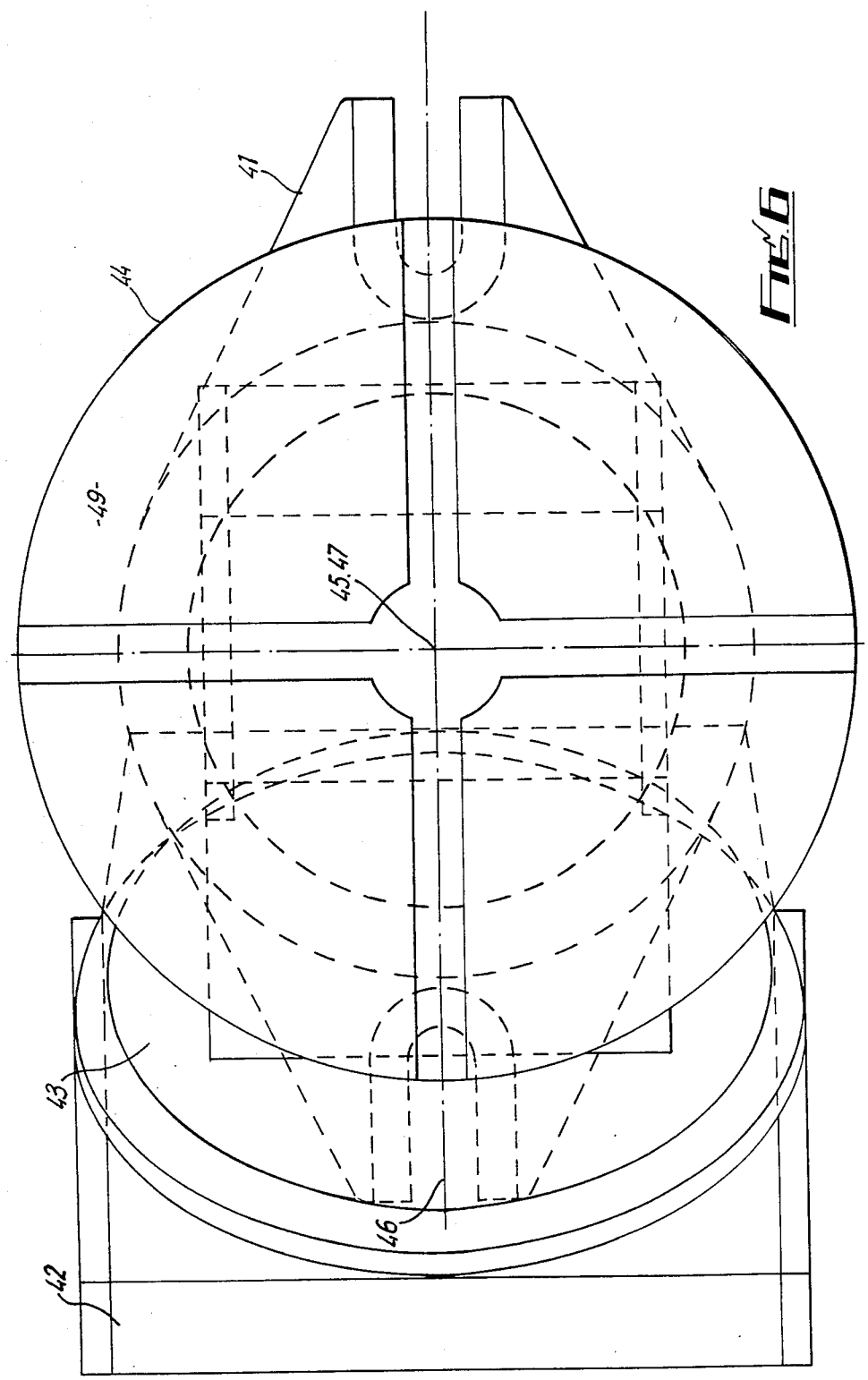

United States Patent [19]

McLean

[11] Patent Number: 4,630,509

[45] Date of Patent: Dec. 23, 1986

[54] ARTICULATED ASSEMBLY OF MEMBERS

[76] Inventor: Joseph G. McLean, 'Crest Nook', 7A Ridge Avenue, Marple, Stockport, Cheshire, United Kingdom

[21] Appl. No.: 591,990

[22] Filed: Mar. 21, 1984

[30] Foreign Application Priority Data

Mar. 26, 1983 [GB] United Kingdom ............... 8308385
Oct. 21, 1983 [GB] United Kingdom ............... 8328255

[51] Int. Cl.⁴ .............................................. B23D 63/14
[52] U.S. Cl. ...................................... 76/37; 76/78 R; 76/74; 269/71
[58] Field of Search ............... 76/37, 43, 41, 74, 78 R, 76/79, 40, 42, 75; 51/217 A, 217 R, 225; 269/71

[56] References Cited

U.S. PATENT DOCUMENTS

| | | | |
|---|---|---|---|
| 1,092,867 | 4/1914 | Sellew | 269/71 |
| 2,535,439 | 12/1950 | McEwan | 76/75 |
| 2,574,499 | 11/1951 | Ruscitti et al. | 76/79 |
| 4,287,686 | 9/1981 | Kotthaus | 51/225 |

FOREIGN PATENT DOCUMENTS 26199   1/1971   Japan ................................. 269/71
1098056 1/1968   United Kingdom .

Primary Examiner—Roscoe V. Parker
Attorney, Agent, or Firm—Roylance, Abrams, Berdo & Goodman

[57] ABSTRACT

An articulated assembly of members such as a workpiece support in a machine tool comprises three and preferably four members, each successively rotatably mounted on the previous member, and each successive axis of rotation being inclined relative to the preceding axis of rotation. The axis of rotation of the third member on the second member is preferably inclined at 45° to the other axes of rotation and the three axes intersect at a common point which is preferably at the center of a workpiece mounted on the table surface of fourth member. In this way the workpiece can be presented to a tool at any desired angular disposition with little or no positional displacement.

13 Claims, 6 Drawing Figures

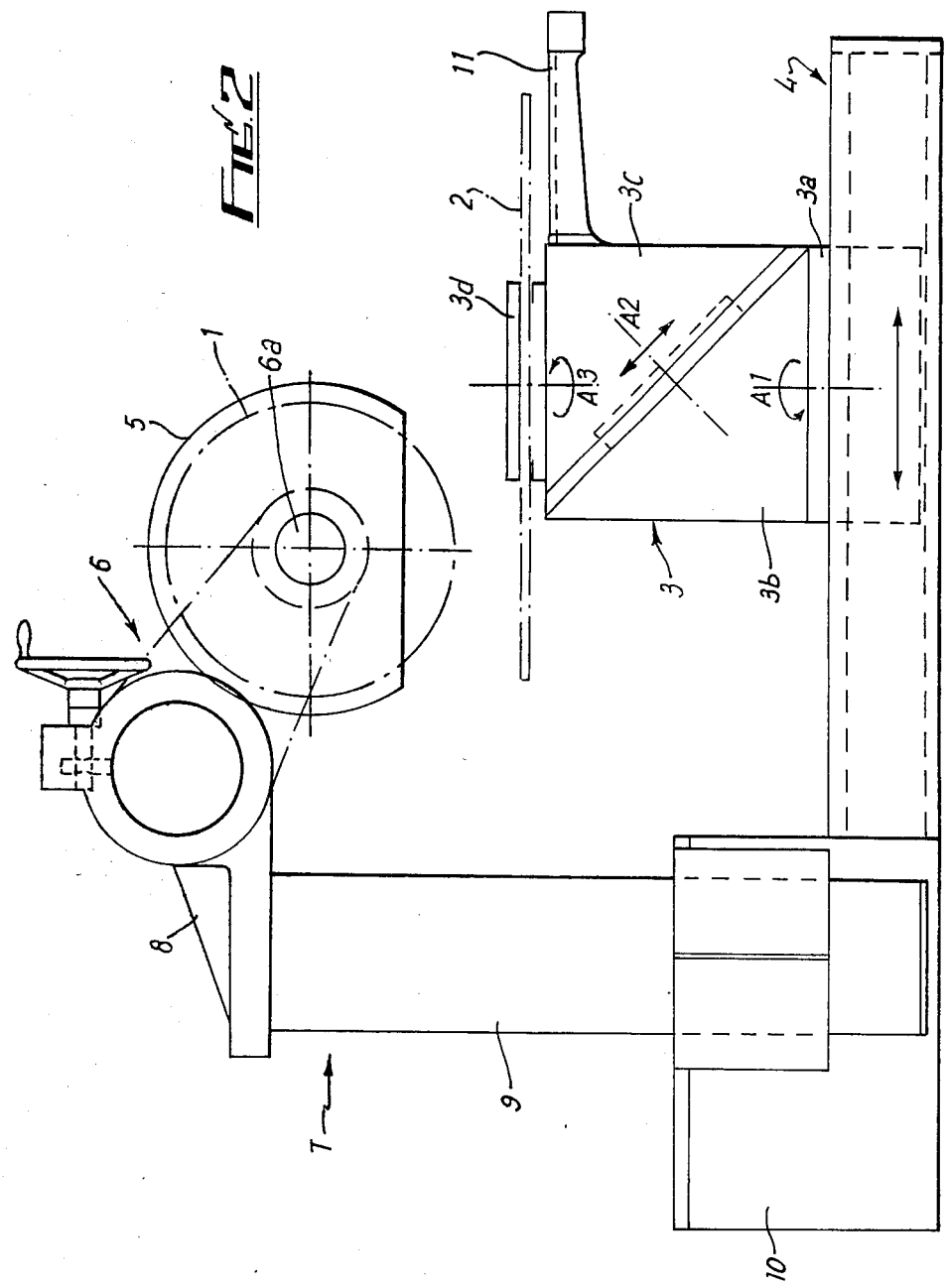

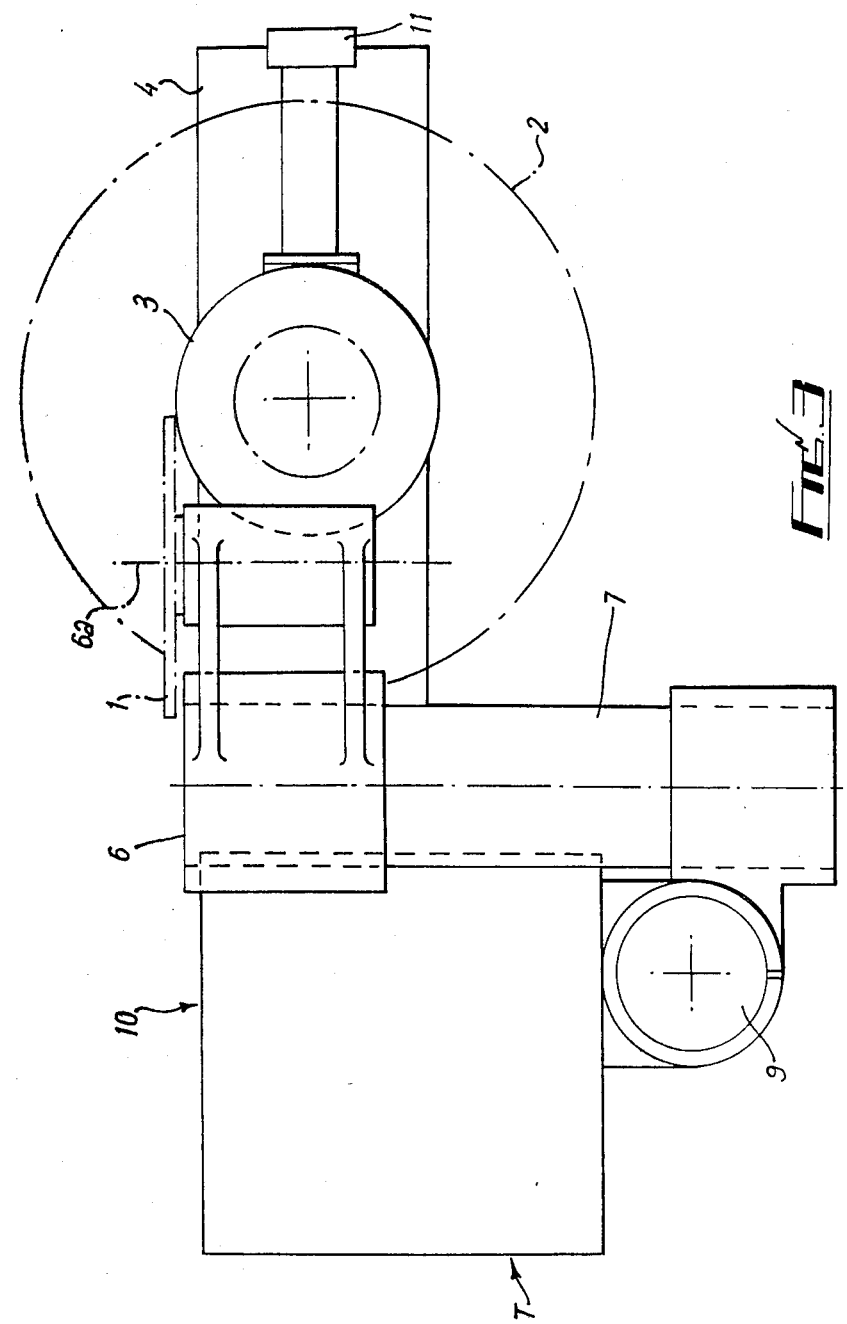

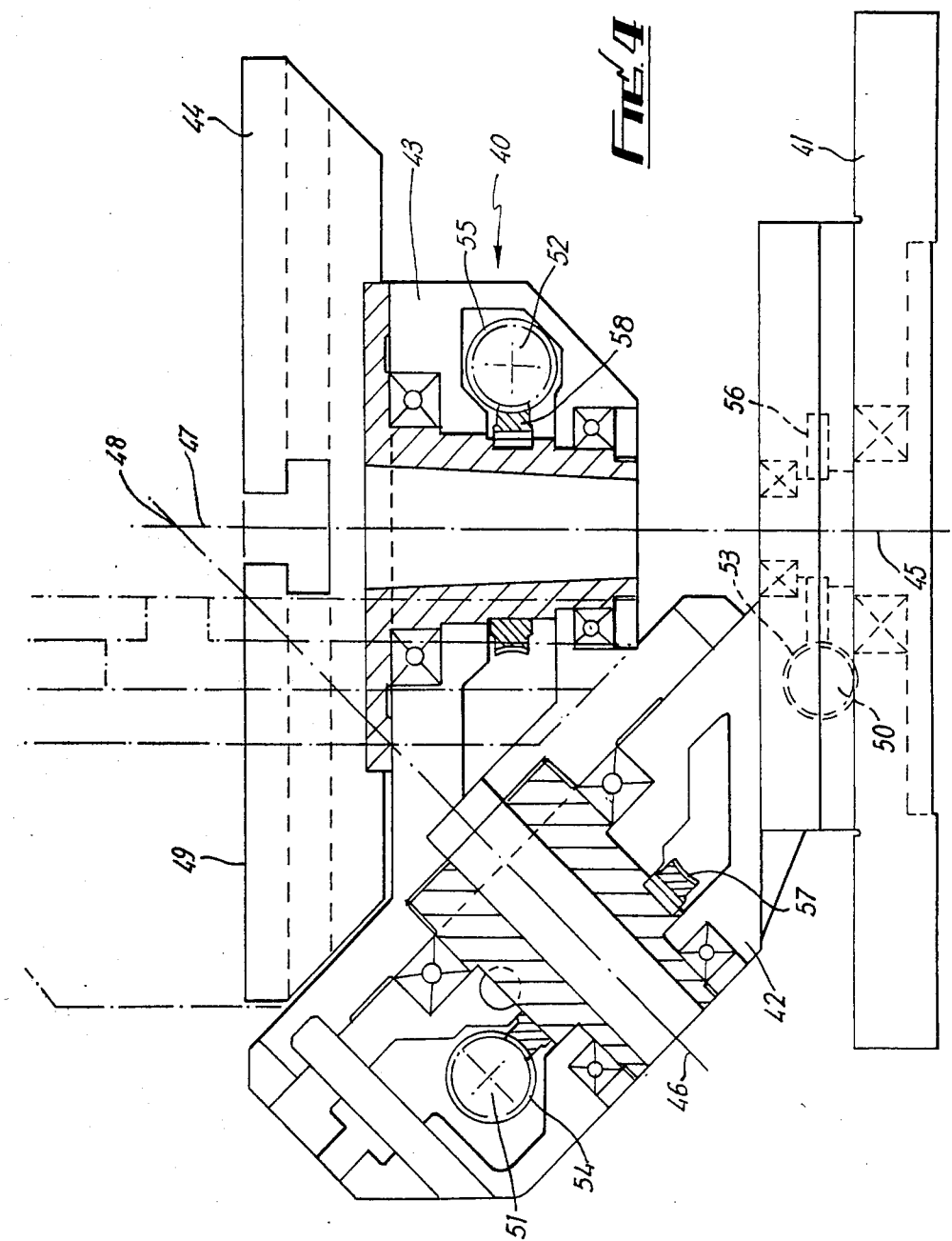

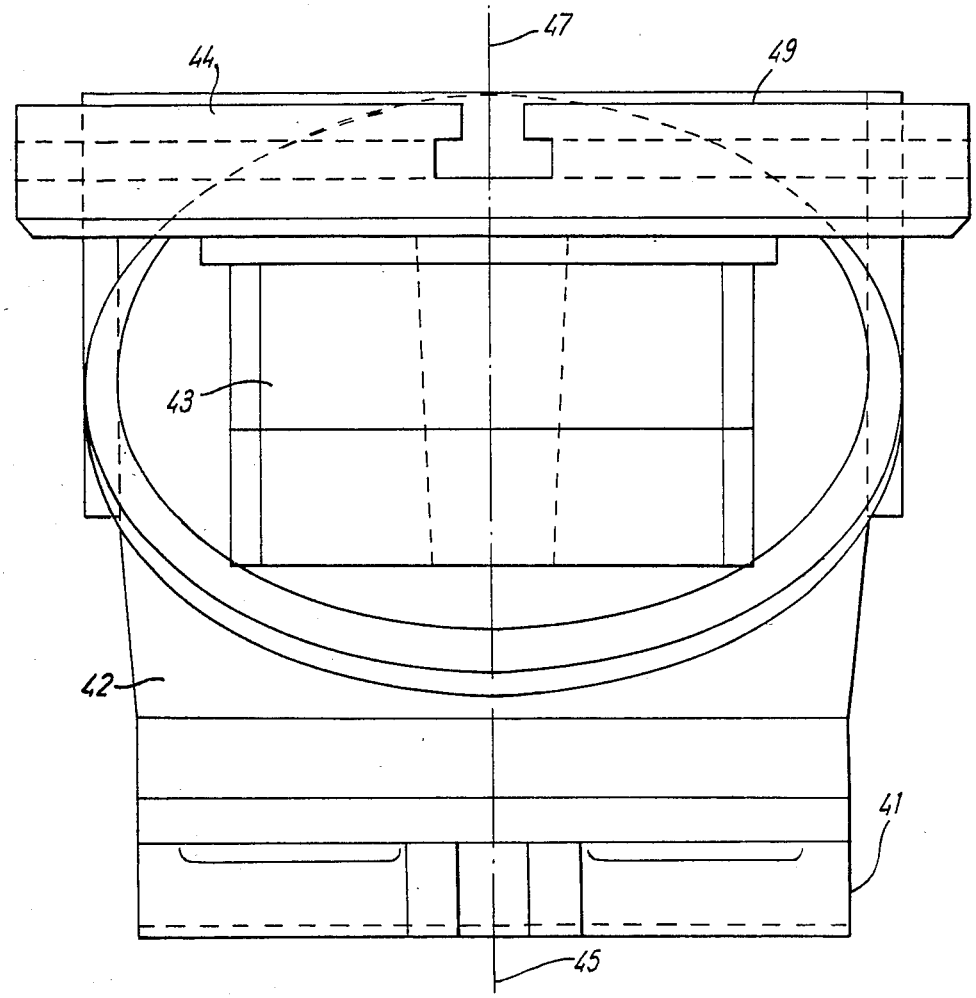

ARTICULATED ASSEMBLY OF MEMBERS

This invention relates to an articulated assembly of members and in particular to articulated members incorporated in a machine tool for the presentation of a tool and a workpiece to each other with any desired relative angular disposition. The invention has particular, but not exclusive application in relation to a machine tool for the grinding or sharpening of the teeth of a circular saw blade.

Machine tools for the aforesaid purpose are known, i.e. tool and cutter, grinder, or a file sharpening machine, in which a workpiece and a grinding wheel are mounted in the machine tool at a desired relative angular disposition. Either one of the workpiece and grinding wheel, usually the latter, is the reciprocated relative to the other to effect the grinding of a tooth. When such grinding is completed the workpiece is processed by one tooth pitch so that the next tooth can be ground.

This operation is a time consuming one and readily leads to inaccurate grinding of the teeth as the method of indexing is usually manual.

It is an object of the present invention to provide an assembly of members, for example in a machine tool, in which the aforementioned disadvantage is avoided or at least substantially reduced.

The invention provides an articulated assembly of members comprising a first member, a second member mounted thereon for rotation relative thereto about a first axis and a third member mounted on the second member for rotation relative thereto about a second axis inclined relative to the first axis.

A fourth member may be provided which is mounted on the third member for rotation about a third axis inclined relative to the second axis. In this case the second axis may be equally inclined relative to the first and third axes, and said inclination may be 45°.

Preferably said three axes intersect at a common point throughout the range of relative angular movement of said members. The point of intersection of said three axes may lie adjacent an outer surface of said fourth member to that side thereof remote from said first, second and third members.

The invention also provides a machine tool for operating on a workpiece comprising a tool holding means and a workpiece support, one of said tool holding means and said workpiece support comprising said assembly of members.

The machine tool may comprise means for positionally adjusting at least one of said tool holding means and said workpiece support relative to the other, and said positional adjustment may comprise movement of said one in a direction towards and away from said other and also movement laterally of said direction.

Drive means may be provided for effecting the relative rotary movement of said parts relative to each other, and for adjusting the relative positional movement of said tool holding means and said workpiece support relative to each other. Control means may be provided and be operable to control such drive means.

Preferably said workpiece support comprises said assembly of members. In this case said machine tool may comprise means operable to effect reciprocating motion of said workpiece support which may be mounted in said machine tool so as to be reciprocable towards and away from said tool holding means to facilitate the effecting of said operation. The workpiece support may be mounted on guides of a table of said machine tool. The machine tool may comprise drive means operable so that said tool holding means may be driven in rotation also to facilitate effecting of said operation. The machine tool may also comprise a tool in the form of a grinding wheel.

Embodiments of apparatus in accordance with the invention will now be described with reference to the accompanying drawings in which:

FIGS. 1 to 3 are respectively a front elevation, a side elevation and a plan of a first embodiment, and FIGS. 4 to 6 are respectively a sectional side elevation, an end elevation and a plan of a second embodiment.

Referring now to FIGS. 1 to 3, there is shown a machine tool T for the grinding or sharpening of the teeth of a circular saw blade 2. The saw blade 2 is secured to a workpiece support 3 which is mounted on guides 4a of a table 4 of the machine tool T. Disposed above the table 4 is a tool holding means comprising an upstanding pillar 9, an extension arm 7 which is secured to pillar 9 by a bracket 8, and a spindle support bracket 6 mounted at the free end of arm 7. Mounted for rotation within the spindle support bracket 6 is a spindle 6a on which a grinding disc 1 is mounted.

Pillar 9 is movable vertically relative to table 4 and arm 7 is movable horizontally relative to pillar 9, as shown by arrows A and B respectively. In addition either pillar 9 may be rotated about its longitudinal axis relative to table 4, or clamp 8 may be rotated on pillar 9 about that axis. In consequence there is complete freedom of movement for the positional adjustment of saw blade 2 relative to the grinding wheel 1.

The spindle 6a and the grinding wheel 1 are rotatably driven by conventional motor drive means (not shown), and a guard 5 encloses a substantial part of the grinding wheel 1 for safety purposes.

The workpiece support 3 comprises a first 3a which is slidable in guides 4a as referred to above. On part 3a is a frusto-cylindrical second part 3b which can rotate on part 3a about a vertical first axis A1. A frusto-cylindrical third part 3c is mounted on part 3b so as to be rotatable about a second axis A2 and a fourth part 3d, to which the workpiece 2 is secured, is mounted on part 3c so as to be rotatable about a third axis A3. Second axis A2 is inclined at 45° to axes A1 and A3 so that the latter may be coincident or relatively inclined by up to 90° as desired. By virtue of the relative movements of parts 3b and 3c relative to part 3a the saw blade 2 can be presented to the grinding wheel 1 at any angular disposition required. This may be facilitated by indexing means 11 and such indexing means may be manually operable or controlled by control means (not shown).

With the saw blade 2 at the desired angular disposition and the rotating grinding wheel 1 correctly positioned relative to the saw blade 2, the saw blade 2 may be reciprocated past the grinding wheel 2 by means of a motor (not shown) driving, via a gearbox 10, the workpiece support 3 along the guides 4a. In this way a grinding pass is made. When the grinding of a tooth has been effected the saw blade 2, and part 3d to which it is secured, are then rotated about axis A3 by an angular amount equal to the angular pitch of the teeth of blade 2 so that the operation can be repeated on the next successive tooth.

When all of the teeth of blade 2 have been ground at one face of blade 2 the angular disposition of parts 3b and 3c relative to parts 3a and 3b respectively may be made equal but opposite, relative to a datum position, to those previously set. The blade is then turned over and positionally reset, and the grinding wheel is reset, so that the blade and grinding wheel are again at the required relative angular disposition for the grinding of the other face of each tooth to be performed. The procedure is then repeated for the opposite face of saw blade 2. However this invention has particular applicability to the grinding of reverse form toothed blades such as are used for the manufacture of paper tubes and boards, in which case the direction of indexing of the saw blade is reversed for the grinding of the teeth on the opposite face of saw blade 2.

By means of the arrangement hereindisclosed the grinding of new teeth or the sharpening of existing teeth may be readily accomplished in a simple, quick and accurate manner.

It has been found that, by means of the invention, a workpiece (or machine tool) can be offered to a machine tool (or workpiece) in like manner and disposition at any angle or location on or inside the hemisphere described by its rotation about its base's centre, thus allowing of sequential operation on a workpiece by automatic equipment having a multiplicity of machine tools operatively carried thereby.

Referring now to FIGS. 4 to 6 there is shown an articulated assembly of members 40 which may for example be a workpiece support in a machine tool. The assembly 40 comprises members 41, 42, 43, and 44. First member 41 is a base which may be secured to a table (not shown) of the machine tool. Second or stand member 42 is mounted on base member 41 for rotation about a first axis 45. A third or top member 43 is mounted on stand member 42 for rotation about a second axis 46 which is inclined at 45° to first axis 45. A fourth or table member 44 is mounted on top member 43 for rotation about a third axis 47 which is inclined at 45° to a second axis 46. The three axes 45, 46, 47 are coincident at a point 48 which lies above the outer surface 49 of table member 44, to provide a datum point for a workpiece (not shown) secured to the table member 44 for subsequent machining at any orientation.

In the configuration shown, axes 45 and 47 are coincident. If the top member 43 is rotated about axis 46 relative to stand member 42, the table member 44 will likewise move about axis 46 but the centre of the workpiece will remain at or adjacent the point 48. When 180° of such movement has occurred the surface 49 will be vertical and axis 47 will be horizontal but the centre of the workpiece will still remain at or adjacent the point 48, as shown by the chain-dotted lines in FIG. 4.

Such an arrangement will have particular application in cases where the orientation of a workpiece attached to table member 44 is to be changed with little or no displacement thereof.

Rotation of members 42, 43 and 44 about axes 45, 46 and 47 may be effected by respective motor driven shafts 50, 51, 52 via respective worms 53, 54, 55 and wheels 56, 57, 58 and the motors (not shown) of such motor drives may be microprocessor or computer controlled.

Alternatively the rotations may be effected manually for example by hand wheels attached to shafts 50, 51 and 52 and indexing means (not shown) may be provided for facilitating accurate rotation of the relevant member to the desired angular disposition relative to the base member 41.

Although in the embodiments illustrated, all of the rotational axes lie in a common plane, two being coincident and the intermediate axis being inclined at 45° to such coincident axes, in other arrangements alternative dispositions may be provided. Thus, for example, in one alternative, whilst the axes again lie in a common plane, two of such axes are mutually perpendicular and the third is inclined at 45° to such mutually perpendicular axes.

It is not required, however, that all of the axes lie in a single plane, another useful configuration being one in which two of the axes lie in a given plane at 45° to each other whilst the third axis is likewise inclined at 45° relative to the first axis but is rotated about such first axis through 90° from the common plane of the first and second such axes.

Alternative dispositions to the 45° hereinreferred to may be found to be of application in some circumstances.

For the purpose of supplying electrical power to stepper motors for rotating the shafts 50,51,52 the spindles of the members 42,43,44 are hollow and accommodate rotary electrical connections (not shown) disposed on the axes 45,46,47.

The invention provides that a tool, which may be for example a cutting device, drill or welding device, may require only a simple forward and reverse motion in order to operate on a workpiece at more than one location since the workpiece itself may be moved to the required orientations for receipt of the tool. This can obviate the need for computer controlled tool manipulators and thereby save cost of a machine installation. The principal advantage of the present invention lies in that the workpiece can be correctly positioned in both location and orientation senses, with very simple programming of the workpiece holding device, so that the tool can always operate in a single direction as mentioned above. The programming of a tool to operate in required location and orientation senses on a fixed workpiece is very complicated and expensive and this is obviated by the present invention.

A further advantage of the invention lies in having the point of concurrency of the three axes above the worktable surface. This enables the workpiece to be rotated relative to a tool for operation on up to 5 sides of a cube, for severing the workpiece on a datum plane parallel with the work table or base surface of the workpiece, or even generation of a spherical object.

The invention also has application in flexible manufacturing wherein the workpiece holding device is palletised and mounted on a conveyor system. The workpiece can then be conveyed through a plurality of work stations in each of which some machining operation is performed thereon, the device being programmed to orient the workpiece as required at each work station to receive the respective tool at that station. Each tool at each work station thereby is only required to make a simple forward and reverse motion instead of a complicated, programmed movement, thus saving on the overall cost of the installation and manufacturing process.

In various forms of machining, and welding in particular, it is advantageous that a workpiece having angled faces can be orientated so that any particular face can be horizontal or vertical as desired for the machining or welding operation.

What is claimed is:
1. An articulated assembly, comprising:

a first base member;
a second member mounted on said first base member for rotation relative thereto about a first axis;
a third member mounted on said second member for rotation relative thereto about a second axis; and
a fourth member mounted on said third member for rotation relative thereto about a third axis, said fourth member having an outer surface with means for mounting a tool or workpiece,
said first and third axes being co-axial and said first, second and third axes being co-planar when said first and second members are in at least a first relative position, said first and third axes being perpendicular and said first, second and third axes being co-planar when said first and second members are in at least a second relative position, said second axis being inclined relative to said first and third axes at an angle of substantially 45°, said axes intersecting at a common point throughout the range of angular movement of said members, said common point lying outside said fourth member and adjacent to and spaced from said outer surface.

2. An assembly according to claim 1 wherein respective drive means are operably coupled to rotate each member relative to that member on which it is mounted.

3. An assembly according to claim 2 wherein said drive means comprises a wheel attached to the member to be rotated and a shaft and a worm thereon housed in the member on which said rotatably driven member is mounted.

4. An assembly according to claim 3 comprising a respective hand wheel attached to each shaft.

5. An assembly according to claim 3 comprising a respective motor drivingly connected to each shaft.

6. An articulated assembly according to claim 5 wherein programmable means is operatively coupled to said motors to effect a desired orientation of said outer surface.

7. A machine tool for operating on a workpiece, comprising:
tool holding means;
a workpiece support; and
an articulated assembly coupled to one of said tool holding means and said workpiece support, said articulated assembly including
a first base member,
a second member mounted on said first base member for rotation relative thereto about a first axis,
a third member mounted on said second member for rotation relative thereto about a second axis, and
a fourth member mounted on said third member for rotation relative thereto about a third axis, said fourth member having an outer surface with means for mounting a tool or workpiece,
said first and third axes being co-axial and said first, second and third axes being co-planar when said first and second members are in at least a first relative position, said first and third axes being perpendicular and said first, second and third axes being co-planar when said first and second members are in at least a second relative position, said second axis being inclined relative to said first and third axes at an angle of substantially 45°, said axes intersecting at a common point throughout the range of angular movement of said members, said common point lying outside said fourth member and adjacent to and spaced from said outer surface.

8. A machine tool according to claim 7 comprising means operable to positionally adjust one of said tool holding means and said workpiece support relative to the other.

9. A machine tool according to claim 8 wherein said position adjusting means is operable to move one of said tool holding means and said workpiece support in a direction towards and away from the other, and transversely of said direction.

10. A machine tool according to claim 8 wherein said workpiece support comprises said articulated assembly and is positionally adjustable towards and away from said tool holding means.

11. A machine tool according to claim 10 comprising a table having guides thereon on which said workpiece support is slidingly mounted.

12. A machine tool according to claim 7 comprising a tool and drive means operable to drive in rotation said tool whilst said tool is held in said tool holding means.

13. A machine tool according to claim 12 wherein said tool is a grinding wheel which is held in said tool holding means.

* * * * *